United States Patent Office
3,265,721
Patented August 9, 1966

3,265,721
HEXACHLOROBICYCLO(2.2.1)HEPT-5-ENE - 2,3-DI-METHANOL DI-p-TOLUENESULFONATE AND METHOD OF SOLVOLYSIS THEREOF
Jerome G. Kuderna, Jr., and George R. Haynes, Modesto, Calif., assignors to Shell Oil Company, a corporation of Delaware
No Drawing. Filed Nov. 17, 1958, Ser. No. 774,129
4 Claims. (Cl. 260—456)

The present invention is concerned with organic compounds containing a halogenated polycycloalkene radical such as a dimethanonaphthalene group or a bicyclo-(2.2.1)hept-5-ene wherein alkylene radicals attach directly to the ring nucleus by olefinic bonds. These compounds are useful in the preparation of biocidally active compounds. The exocyclic dienes of the present invention are also valuable as intermediates in the prepartion of polymeric products. The preferred compound of the present invention is 1,4,5,6,7,7-hexachloro-2,3-dimethyl-enebicyclo(2.2.1)hept-5-ene.

The preferred compounds of the present invention may be represented by the following structural formula:

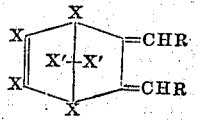

Also of interest is the dimethanonaphthalene ring structure shown in the following structural formula:

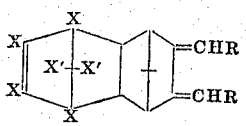

The present invention also encompasses the polycyclic structure shown in the following structural formula:

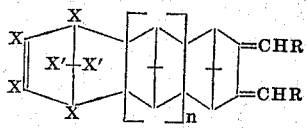

In these formulae, R represents hydrogen or an alkyl group of 1–5 carbon atoms. X represents a halogen (prefably chlorine) and X' represents a halogen (preferably chlorine) or an alkoxy (preferably methoxy) group; n represents 0 through 3.

Examples of specific compounds encompassed by the present invention follow: 1,4,5,6,7,7-hexachloro-2,3-dimethylenebicyclo(2.2.1)hept-5-ene; 1,4,5,6 - tetrafluoro-2,3 - dihexylidene - 7,7 - dimethoxybicyclo(2.2.1)hept-5-ene; 5,6,7,8,9,9-hexabromo - 2,3 - diethylidene - 1,2,3,4, 4a,5,8,8a - octahydro - 1,4,5,8-dimethanonaphthalene; 5,6,7,8 - tetraiodo-2,3-dibutylidene-9,9-diethoxy - 1,2,3,4, 4a,5,8,8a-octahydro-1,4,5,8-dimethanonaphthalene.

Generally speaking, the compounds of the present invention may be prepared by dehydrohalogenation of the corresponding halogenated polycycloalkene having alkyl substituents attached to the ring nucleus, the alpha carbon atom of which has a halogen atom attached thereto. For example, dehydrochlorination of 1,4,5,6,7,7-hexachloro-2,3-bis(chloromethyl)bicyclo(2.2.1)hept - 5 - ene yields 1,4,5,6,7,7-hexachloro - 2,3 - dimethylenebicyclo(2.2.1)hept-5-ene.

It is preferred, however, to prepare the novel compounds of the present invention by solvolysis of the corresponding ditosylate. For example, the heating of the appropriate polycyclic ring ditosylate (p-toluenesulfonate) such as 1,4,5,6,7,7-hexachlorobicyclo(2.2.1)hept-5-ene-2,3-dimethanol di-p-toluenesulfonate in refluxing aqueous ethyl alcohol containing potassium hydroxide yields 1,4,5,6,7,7 - hexachloro - 2,3 - dimethylenebicyclo-(2.2.1)hept-5-ene.

The preparation of the compounds of the present invention will be better understood by reference to the following specific example.

Two hundred grams (0.55 mole) of 1,4,5,6,7,7-hexachlorobicyclo(2.2.1)hept-5-ene-2,3-dimethanol were dissolved in an excess of pyridine (350 grams; 4.4 moles). p-Toluenesulfonyl chloride (232 grams; 1.22 moles) was added to this solution at 10° C. during a period of 30 minutes with stirring. The resulting solution was stirred at 10° C. for 4 hours. If desired, the reaction may be run at room temperature employing any tertiary amine as a substitute for the pyridine. The reaction mixture was then poured into a mixture of 660 ml. of concentrated hydrochloric acid in 2.2 liters of ice water. The precipitate which formed was immediately filtered. This product was recrystallized from methanol to yield 260 grams (58% of theoretical yield) of crystalline 1,4,5,6, 7,7-hexachlorobicyclo(2.2.1)hept-5-ene-2,3 - dimethanol di-p-toluenesulfonate melting at 124–125° C.

Potassium hydroxide (2 grams; 0.03 mole) was dissolved in 100 ml. of 95% ethyl alcohol. 1,4,5,6,7,7-hexachlorobicyclo(2.2.1)hept-5-ene-2,3-dimethanol di-p-toluenesulfonate (10 grams; 0.015 mole) was added and the resulting solution was refluxed for two hours and allowed to cool. The solvent was removed at 25 mm. pressure and the solid residue was extracted with ether. If desired, hexane may be used. After evaporation of the ether at room temperature, a crystalline material which melted at 81–84° C. remained. The yield was 4.8 grams or 99% of theoretical. Analysis calculated for $Cl_6C_9H_4$: Cl, 65.5; found: Cl, 65.5.

The structure of 1,4,5,6,7,7-hexachloro-2,3-dimethyl-enebicyclo(2.2.1)hept-5-ene was confirmed by infrared analysis.

This compound readily polymerized in ether solution at room temperature.

The compounds of the present invention are valuable intermediates in the preparation of biocidally effective compounds, particularly in the preparation of chlorinated hydrocarbon insecticides containing a hexachlorobicyclo-heptene ring nucleus. Compounds of this type have undergone extensive investigation as insecticides since the advent of DDT.

The compounds of the present invention have also found utility as intermediates in the preparation of valuable polymeric products. For example, 1,4,5,6,7,7-hexachloro-2,3 - dimethylenebicyclo(2.2.1)hept-5-ene readily polymerizes when heated in the presence of peroxides and when exposed to ultraviolet radiation. Compounds of the type presently claimed tend to form thermosetting cross-linked polymers which are insoluble and infusible. These compounds can be polymerized singly or in admixture with other polymerizable compounds in a variety of proportions. Among such other compounds are mono-ethylenic compounds which contain a single polymerizable carbon-to-carbon double bond. Examples of this class of compounds are styrene, alpha-methyl styrene, many vinyl and allyl derivatives, the nitriles and many of the esters of acrylic and alpha-substituted acrylic acids. Another group of copolymerizable compounds consists of those compounds having two or more conjugated carbon-to-carbon double bonds, such as butadiene and substituted butadiene, as well as polymers of acetylene, such as vinyl and divinyl acetylene.

It will be understood that unsaturated cyclic compounds, such as coumarone-indene, furfural and cyclohexene, may also be used. Another subclass consists of the unsaturated aliphatic polyesters of saturated polybasic acids, such as divinyl, diallyl and dimethallyl esters of oxalic and malonic acids. Unsaturated aliphatic polyethers of saturated polyhydric alcohols, such as divinyl, diallyl and dimethallyl ethers of glycol, diethylene glycol, trimethylene glycol, and similar derivatives of diglycerol, mannitol, sorbitol, etc., may also be used.

We claim as our invention:

1. As a composition of matter, 1,4,5,6,7,7-hexachlorobicyclo(2.2.1)hept - 5 - ene-2,3-dimethanol di-p-toluenesulfonate.

2. The method for the preparation of a polyalkene of the formula:

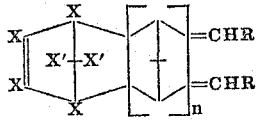

comprising refluxing in aqueous ethyl alcohol containing potassium hydroxide a compound of the formula:

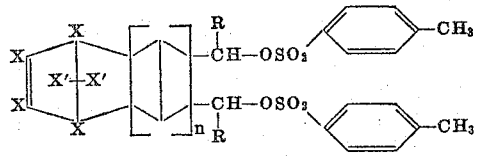

wherein X is halogen, X' is selected from the group consisting of halogen and methoxy, R is selected from the group consisting of an alkyl radical of one to five carbon atoms and hydrogen, and $n$ is a whole number from zero to one.

3. The method for the preparation of 1,4,5,6,7,7-hexahalo-2,3-di($C_1$–$C_5$)-alkylidenebicyclo(2.2.1)hept - 5 - ene comprising refluxing in aqueous ethyl alcohol containing potassium hydroxide 1,4,5,6,7,7-hexahalobicyclo(2.2.1) hept-5-ene-2,3-di($C_1$–$C_5$)-alkanol di-p-toluenesulfonate.

4. The method for the preparation of a 1,4,5,6,7,7-hexachloro - 2,3 - dimethylenebicyclo(2.2.1)hept - 5-ene comprising refluxing in aqueous ethyl alcohol containing potassium hydroxide 1,4,5,6,7,7-hexachlorobicyclo(2.2.1) hept-5-ene-2,3-dimethanol di-p-toluenesulfonate.

References Cited by the Examiner

UNITED STATES PATENTS

| | | | |
|---|---|---|---|
| 2,779,685 | 1/1957 | Frensch et al. | 260—617 |
| 2,779,700 | 1/1957 | Robitschek et al. | |
| 2,912,356 | 11/1959 | Schmerling | 260—648 |
| 3,058,998 | 10/1962 | Nace | 260—666 |

FOREIGN PATENTS

| | | |
|---|---|---|
| 1,002,341 | 2/1957 | Germany. |
| 714,830 | 9/1954 | Great Britain. |
| 773,748 | 5/1957 | Great Britain. |

OTHER REFERENCES

Alder et al., "Ber. Deut. Chem.," 90, pages 1 to 7 (1957).

Crombie et al., J. Chem. Soc. (London), volume of 1957, pp. 1622–1631.

DePuy et al., J. Am. Chem. Soc., vol. 79, pp. 3710–3711 (1957).

Vis et al., J. Org. Chem., vol. 22, pp. 712–718 (1957).

Wagner et al., "Synthetic Organic Chemistry," John Wiley and Sons, Inc., New York, page 57, 1953.

CHARLES B. PARKER, *Primary Examiner.*

HAROLD N. BURSTEIN, LEON ZITVER, ALPHONSO D. SULLIVAN, MILTON STERMAN, *Examiners.*

J. ZIEGLER, S. M. LIEBERSTEIN, J. W. WILLIAMS, F. D. HIGEL, *Assistant Examiners.*